C. B. TRESCOTT.
LOW TEMPERATURE COOKING APPARATUS.
APPLICATION FILED MAY 8, 1917.

1,233,000.

Patented July 10, 1917.

Witnesses:

Inventor:
Charles B. Trescott,

UNITED STATES PATENT OFFICE.

CHARLES B. TRESCOTT, OF CHICAGO, ILLINOIS.

LOW-TEMPERATURE-COOKING APPARATUS.

1,233,000.  Specification of Letters Patent.  Patented July 10, 1917.

Application filed May 8, 1917. Serial No. 167,272.

*To all whom it may concern:*

Be it known that I, CHARLES B. TRESCOTT, a citizen of the United States, residing at Chicago, in the county of Cook and State of Illinois, have invented a new and useful Improvement in Low-Temperature-Cooking Apparatus, of which the following is a specification.

My invention relates to an improved apparatus for practising the process of low-temperature cooking of my Patent No. 1,226,147, dated May 15, 1917. The process referred to employs live steam as the primary source of heat for heating and saturating with moisture the air in the cooking chamber by so reducing the temperature of the steam, which must be below that of the boiling point of water, as to impart to the air the predetermined temperature and saturation for the cooking purpose.

Figure 1:
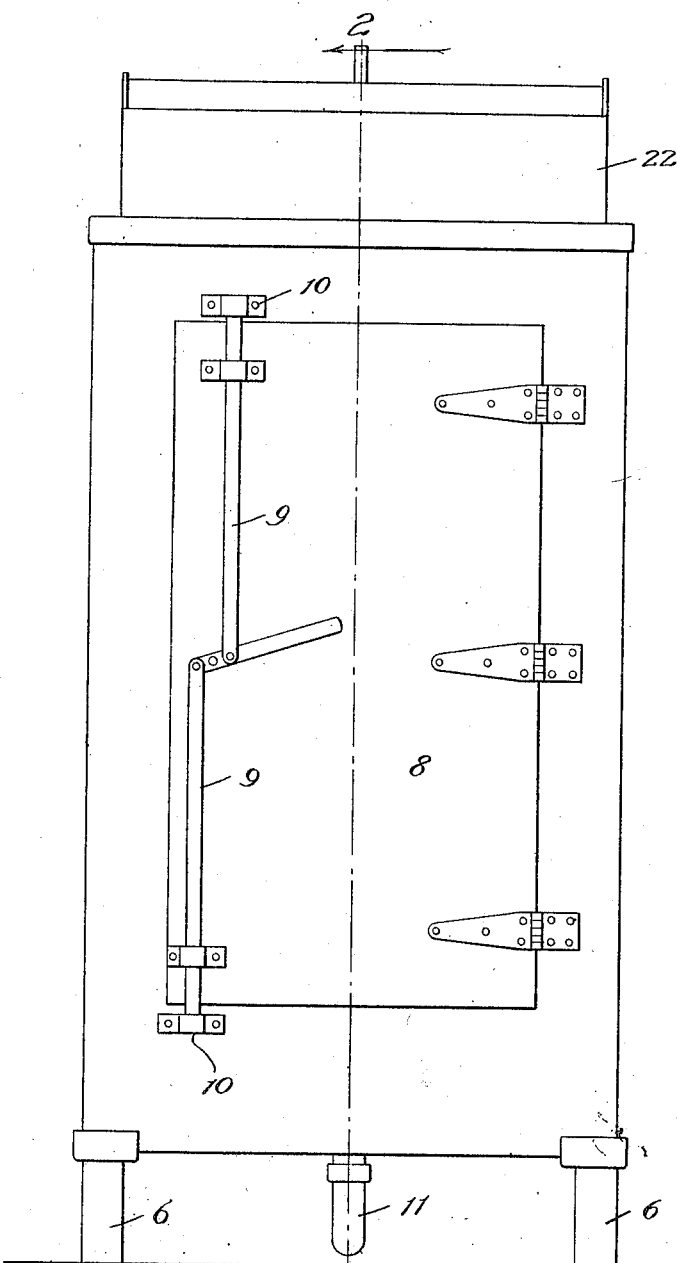
Figure 2:
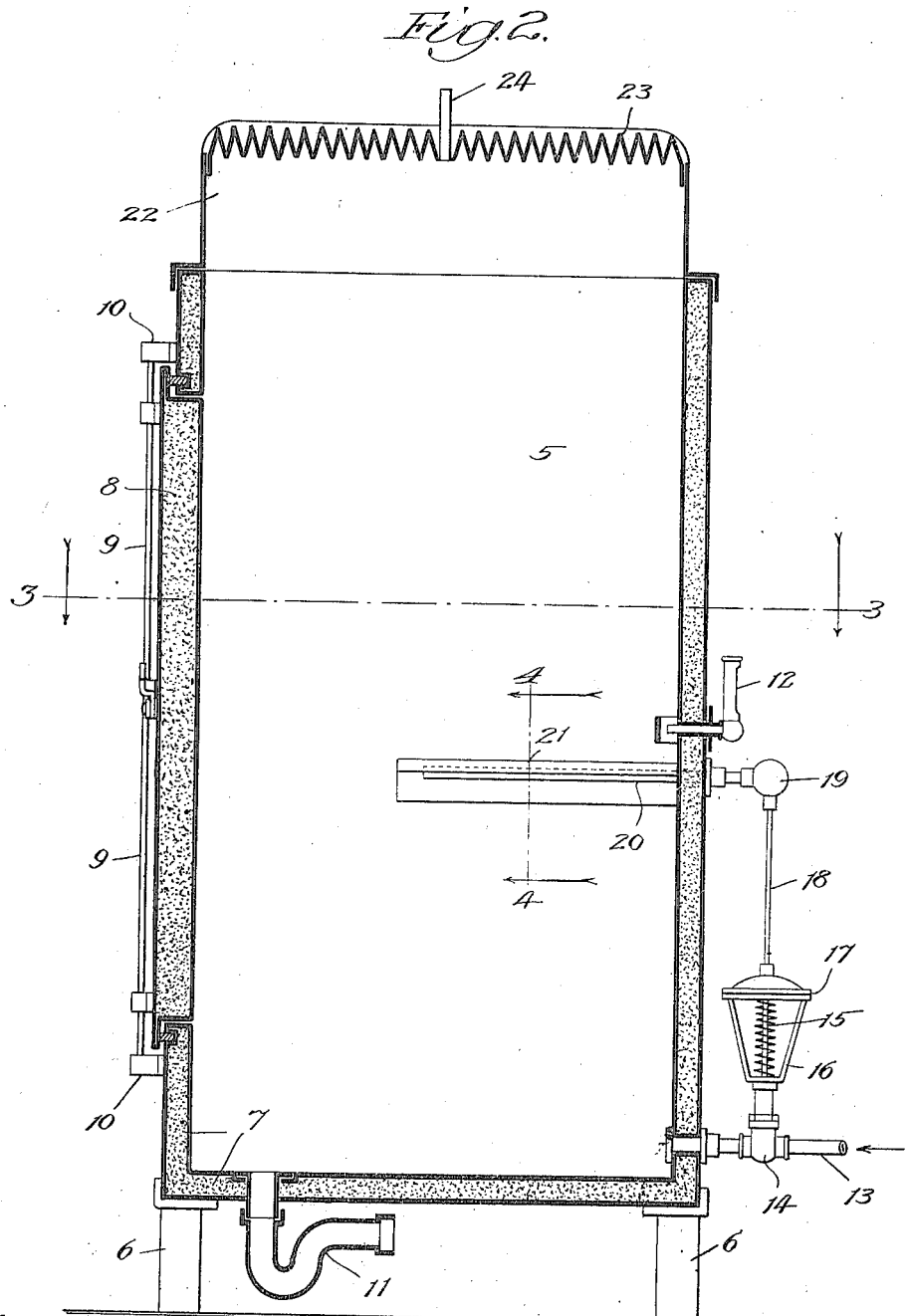
Figure 3:
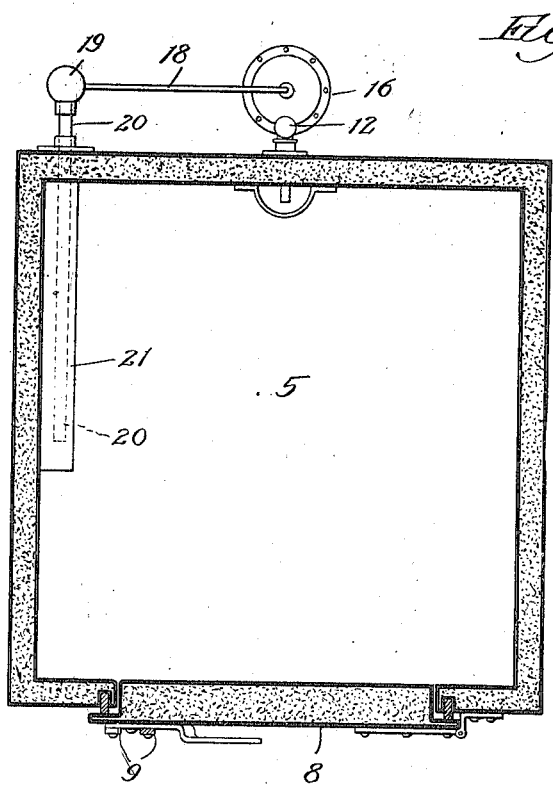
Figure 4:
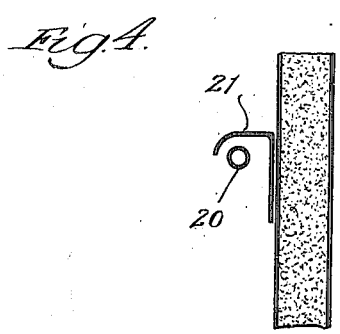

In the accompanying drawings, Figure 1 is a view of my improved apparatus in front elevation; Fig. 2 is a section on line 2—2, Fig. 1; Fig. 3 is a section on line 3—3, Fig. 2, and Fig. 4 is a broken view showing a section on line 4—4, Fig. 2.

The cooking chamber 5 may be of any desired shape, but as shown it is rectangular in cross-section and is formed of thin sheet-metal. The side and bottom walls of the chamber, which is supported on legs 6, are double and filled with heat-insulating material 7 to thoroughly insulate them against loss of heat by radiation; and the chamber is provided with a double-walled door 8, insulated like the bottom and side walls, and the door is provided, as shown in Fig. 1, with lever-operated bars 9, 9, working in loops on the door to enter loops 10, 10 in position on the front chamber-wall to receive the bars for locking the door and to be withdrawn therefrom to unlock it preparatory to opening it for introducing the matter to be cooked and removing the cooked matter. A drain pipe 11 leads through the chamber-bottom, as to a sewer; and a thermometer 12 is shown supported to extend through a wall of the chamber into its interior. A steam-pipe 13 leads, from a suitable source of live-steam supply (not shown), into the cooking chamber near its lower end. This pipe contains a shut-off valve, indicated at 14, on a stem 15, spring-raised for opening the valve and confined between the lower end of a frame 16 and a covered diaphragm 17 on the upper end of the latter. A vertical pipe 18 leads to this diaphragm-device from an ether or other suitable fluid containing chamber 19 having a thermostatic tube 20 extending horizontally from it into the cooking chamber through its adjacent wall; and a shield 21 covers the tube to prevent injury to it, as in introducing matter into the chamber and removing it. The thermostat shown is of a well-known type for opening and closing a valve 14 to control the flow through a pipe, such as the pipe 13. Any other suitable type of thermostat may be employed for my purpose, which is to maintain a uniform temperature in the cooking chamber by closing the valve and shutting off the steam before the temperature rises above the predetermined degree and opening the valve to admit steam before the temperature drops below such degree. A principal feature of my improved apparatus is a thin sheet-metal cover or crown 22 closing the upper end of the chamber, which should be hermetically closed by the cover. This crown is formed of thin sheet-metal to quickly radiate heat and is of the preferred dome-shape illustrated; its upper section may be corrugated, as represented at 23, to augment the heat-radiating surface of the dome, or not, depending on its dimensions, and it is provided with a vent-tube 24.

For the low-temperature cooking of meats in my improved apparatus the heat employed must be below that which would harden the albumen, not exceeding about 180° F.; for cooking hams, the most desirable temperature in the cooking chamber is 135° to 140° F.; and for vegetables it must also be below the boiling point of water, and should not exceed 200° F. to 210° F.

I have principally employed my apparatus for cooking hams, and therefore confine thereto the following description of the operation, though it is equally effective for the low-temperature cooking of other meats and of vegetables:

In the initially cool condition of the chamber 5, the hams to be cooked are introduced into it and the door is closed. Thereupon steam is introduced through the pipe 13 at a temperature of about 230° F. to 240° F. (10 to 12 pounds pressure). The steam rises in the chamber, heating and expanding the air therein, whereby the steam is condensed to a fog and moistens the air, and the heat carried by the moisture permeates the hams uniformly and gradually heats them throughout. The heated moist air rises into the dome 22, the walls of which rapidly radiate off much of the heat, and the consequent cooling of the moistened air produces, aided by the expansion by the steam-heat of the air rising in the chamber, a circulation within the latter, the steam-heated air tending to rise through the central part of the chamber and the cooled air to descend along the sides, while the water of condensation in the dome drops downwardly into the chamber and assists in copiously moistening or saturating the heated air therein. The vent-pipe 24 prevents pressure in the apparatus, which should be avoided and which might otherwise tend to bulge the walls. In the progress of the operation, the thermostat maintains the predetermined temperature uniform in the cooking chamber, by closing the valve 14 to prevent excess and opening it to prevent undue reduction thereof. When the hams have become heated, as they do uniformly throughout, they begin to cook, and when they are finished they are found to be cooked thoroughly and alike, and thus to perfection; moreover, they have undergone comparatively light shrinkage in cooking and have retained their juices and natural flavor.

I realize that considerable variation is possible in the details of construction herein shown and described, and I do not intend by illustrating a single specific or preferred embodiment of my invention to be limited thereto, it being my intention in the following claims to claim protection for all the novelty there may be in my invention as fully as the state of the art will permit.

I claim:

1. A low-temperature cooking apparatus, comprising a cooking chamber having heat-insulated bottom and side walls, a valved steam-supply pipe leading into the lower part of said chamber, a thermostat extending in said chamber and connected with the valve in said pipe to regulate the supply of steam therethrough, and a sheet-metal heat-radiating cover closing the chamber-top.

2. A low-temperature cooking apparatus, comprising a cooking chamber having double side and bottom walls and a hinged door filled with heat-insulating material, a valved steam-supply pipe leading into the lower part of said chamber, a thermostat extending in said chamber and connected with the valve in said pipe to regulate the supply of steam therethrough, and a sheet-metal heat-radiating crown closing the chamber-top.

3. A low-temperature cooking apparatus, comprising a cooking chamber having heat-insulated bottom and side walls, a valved steam-supply pipe leading into the lower part of said chamber, a thermostat extending in said chamber and connected with the valve in said pipe to regulate the supply of steam therethrough, a sheet-metal heat-radiating crown closing the chamber-top, and a vent-pipe in said crown.

CHARLES B. TRESCOTT.